Oct. 14, 1924.
W. W. DILLER
1,511,951
BRAKE CAM PIN
Filed March 3, 1923
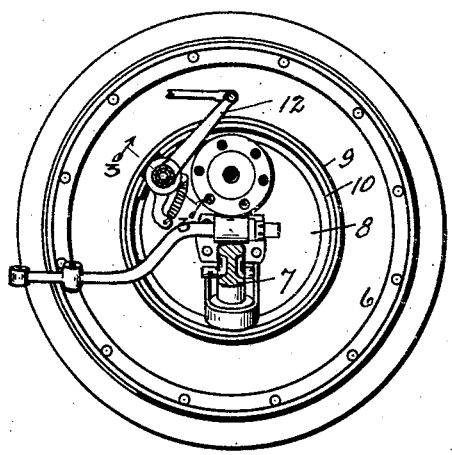
Fig.1.
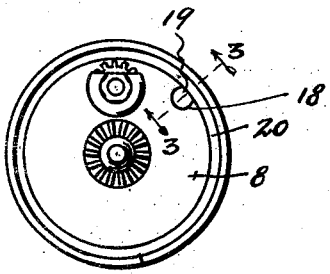
Fig.2.
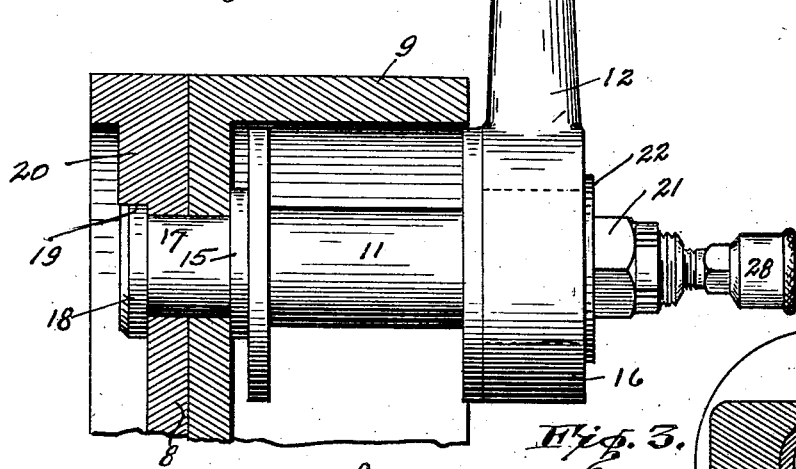
Fig.3.
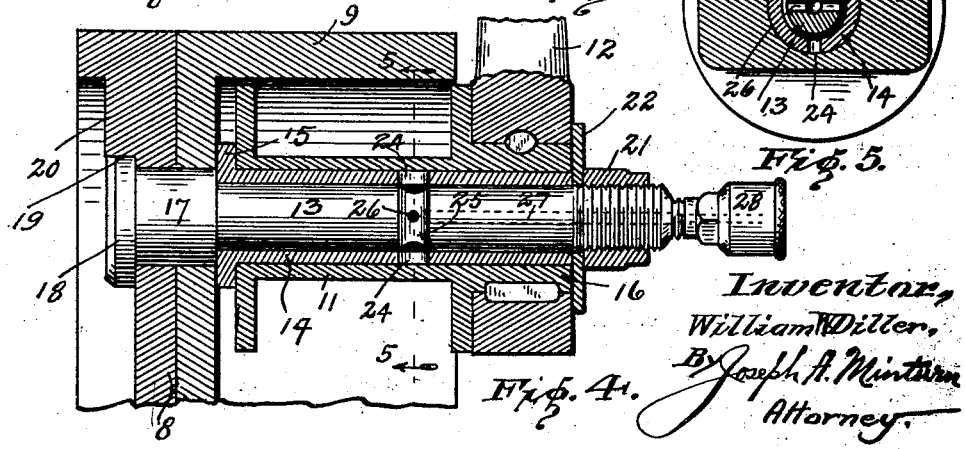
Fig.4.
Fig.5.
Inventor,
William W. Diller,
By Joseph A. Minturn
Attorney.

Patented Oct. 14, 1924.

1,511,951

UNITED STATES PATENT OFFICE.

WILLIAM W. DILLER, OF INDIANAPOLIS, INDIANA.

BRAKE-CAM PIN.

Application filed March 3, 1923. Serial No. 622,481.

*To all whom it may concern:*

Be it known that I, WILLIAM W. DILLER, a citizen of the United States, residing at Indianapolis, in the county of Marion and State of Indiana, have invented new and useful Improvements in Brake-Cam Pins, of which the following is a specification.

This invention relates to improvements in pins for supporting the brake-cams of motor cars and trucks, and for attaching the pins to the rear axle disk, and the object is to, first, provide means for easily and quickly detaching and removing the pins for the purpose of making repairs, second, to provide a sleeve of hard, slow-wearing material to take the wear of the cam and cam operating lever off of the pin, and third, to thoroughly lubricate the wearing surfaces between the sleeve and pin.

I accomplish the above, and other objects which will hereinafter appear, by the mechanism illustrated in the accompanying drawing, in which—

Fig. 1, is a cross section of a rear axle showing the inner-side of a road-wheel in elevation. Fig. 2, shows the rear axle disk in elevation looking at its outer side. Fig. 3, is a cross section of the disk and flange on a larger scale, on the line 3—3 of Figs. 1 and 2. Fig. 4, is a like view in which the cam and sleeve are sectioned longitudinally to show the pin, and Fig. 5, is a cross section on the line 5—5 of Fig. 4.

Like characters of reference indicate like parts throughout the several views of the drawing.

The road-wheel 6, axle 7, disk 8, flange 9, brake-band 10 and the cam 11 with its crank 12, are all of usual construction and operation.

The pin 13 is considerably smaller in diameter than the bore in the cam 11, in order to provide room for a sleeve 14 of steel or other metal hardened to form a good bearing surface. This has a flange 15 at one end which bears against the disk 8, and the length of the sleeve from said flange 15 is slightly longer than the length of the bore in the cam and crank-shaft 16, for reasons that will presently appear.

A portion 17 of the pin is of normal or unreduced diameter where it is seated in the disk, and on the adjacent end in the disk is a head 18 one side 19 of which is flattened to fit against an annular offset 20 of the disk and prevent rotation of the pin.

The end of the pin 13, which is opposite the head 18, is screw-threaded and receives a nut 21 thereon. A washer 22 is assembled between the nut and the adjacent end of the sleeve 14. The sleeve acts as a spacer to determine the minimum distance between the washer 22 and the disk 8. The cam 11 and the integral crank-hub 16 are retained on the sleeve 14 with a fit sufficiently loose to be rocked freely, and the pin is clamped rigidly in place by tightening up the nut 21.

Oil-holes 24 in annular series are formed through the sleeve 14 for the discharge of a lubricant which has been delivered to an annular channel 25 formed in the pin 13. This lubricant is supplied through the channel through holes 26 communicating with a center-bore 27 that extends to an oil-cup 28 screwed into the end of the pin.

Having thus fully described my invention, what I claim as new and wish to secure by Letters Patent, is—

1. In a device for the purposes specified, the combination with a disk having an offset and a brake-cam, of a pin seated in a hole in the disk, said pin having a head flattened on one side with the flattened side against the offset of the disk, said pin having the end opposite the head screw-threaded, a nut on the threaded end and a spacing sleeve mounted on the pin intermediate the disk and nut on which pin the cam is mounted.

2. In a device for the purposes specified, the combination with a disk having an offset, and a brake-cam, of a pin seated in a hole in the disk, said pin having a head flattened on one side with the flattened side against the offset of the disk, said pin having a screw-threaded opposite end, a nut on the threaded end of the pin and a spacing sleeve intermediate the nut and disk, on which the cam is loosely mounted, said pin and sleeve having oilways through which a lubricant reaches the wearing surface of the cam.

3. In a device for the purposes specified, the combination with a disk having an offset, and a brake-cam, of a pin seated in a hole in the disk, said pin having a head flattened on one side with the flattened side against the offset of the disk, said pin having a threaded opposite end and an annular channel intermediate the ends of the pin, and said pin having a passageway from the threaded end of the pin discharging into the channel, an oil-cup discharging into the passageway, a nut on the threaded end of the pin, a washer next to the nut, a sleeve intermediate the washer and disk having an inner end flange between which and the washer the cam is loosely mounted on the sleeve, said sleeve having oil-holes communicating with the channel in the pin.

Signed at Indianapolis, Indiana, this the 30 day of January, 1923.

WILLIAM W. DILLER.